April 4, 1950      H. W. BRADLEY      2,502,414
APPARATUS FOR USE IN THE VISUAL INSPECTION
OF TIN PLATES AND THE LIKE
Filed Sept. 19, 1945      4 Sheets-Sheet 4
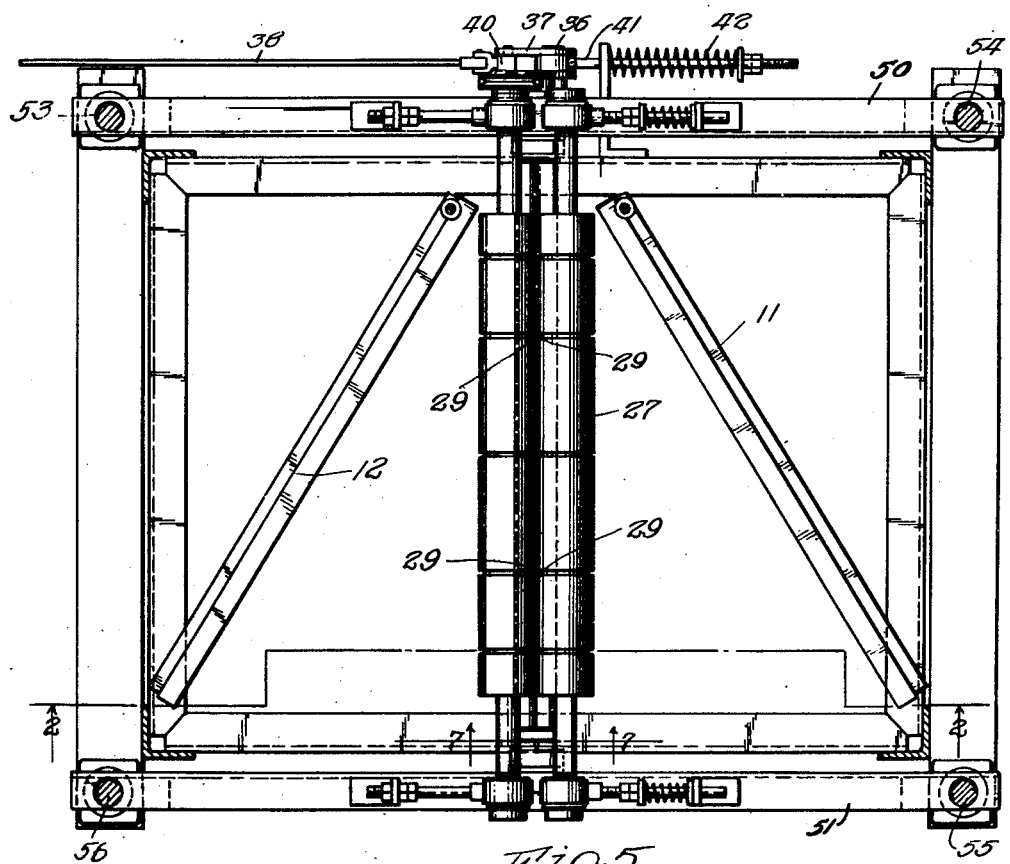
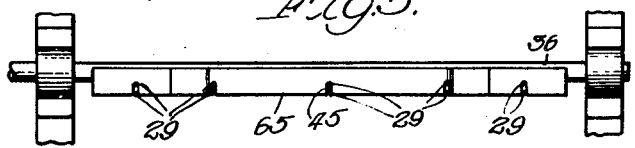
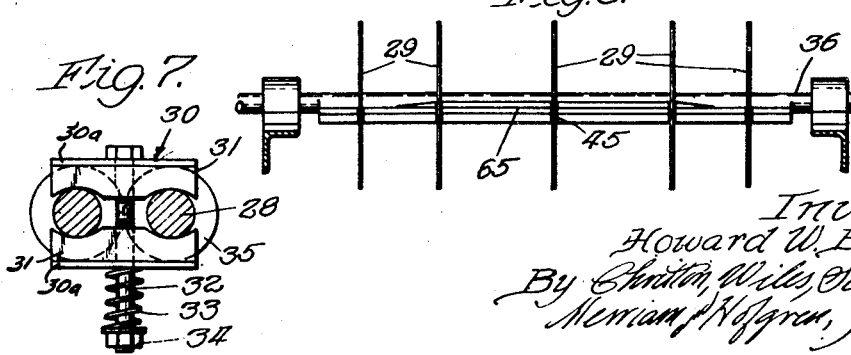
Inventor:
Howard W. Bradley, Patented Apr. 4, 1950

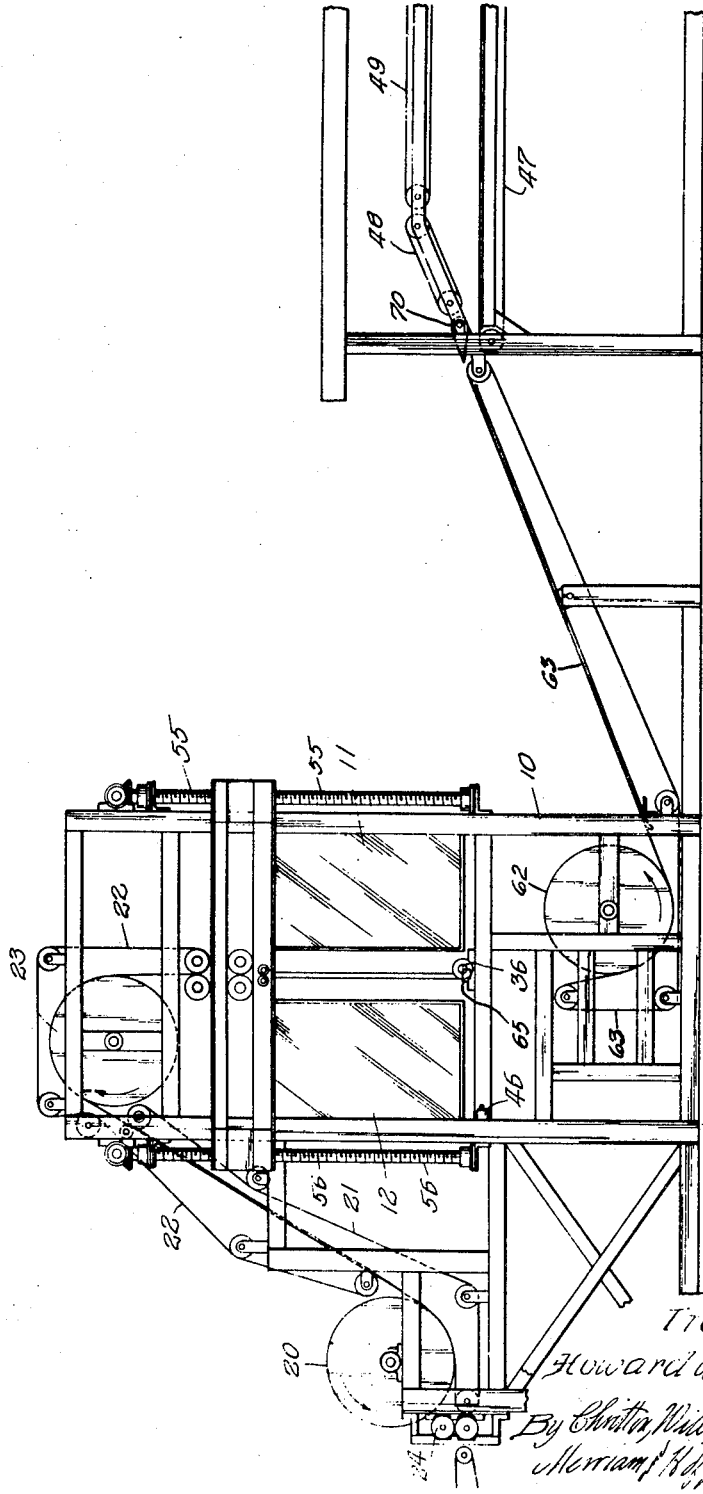

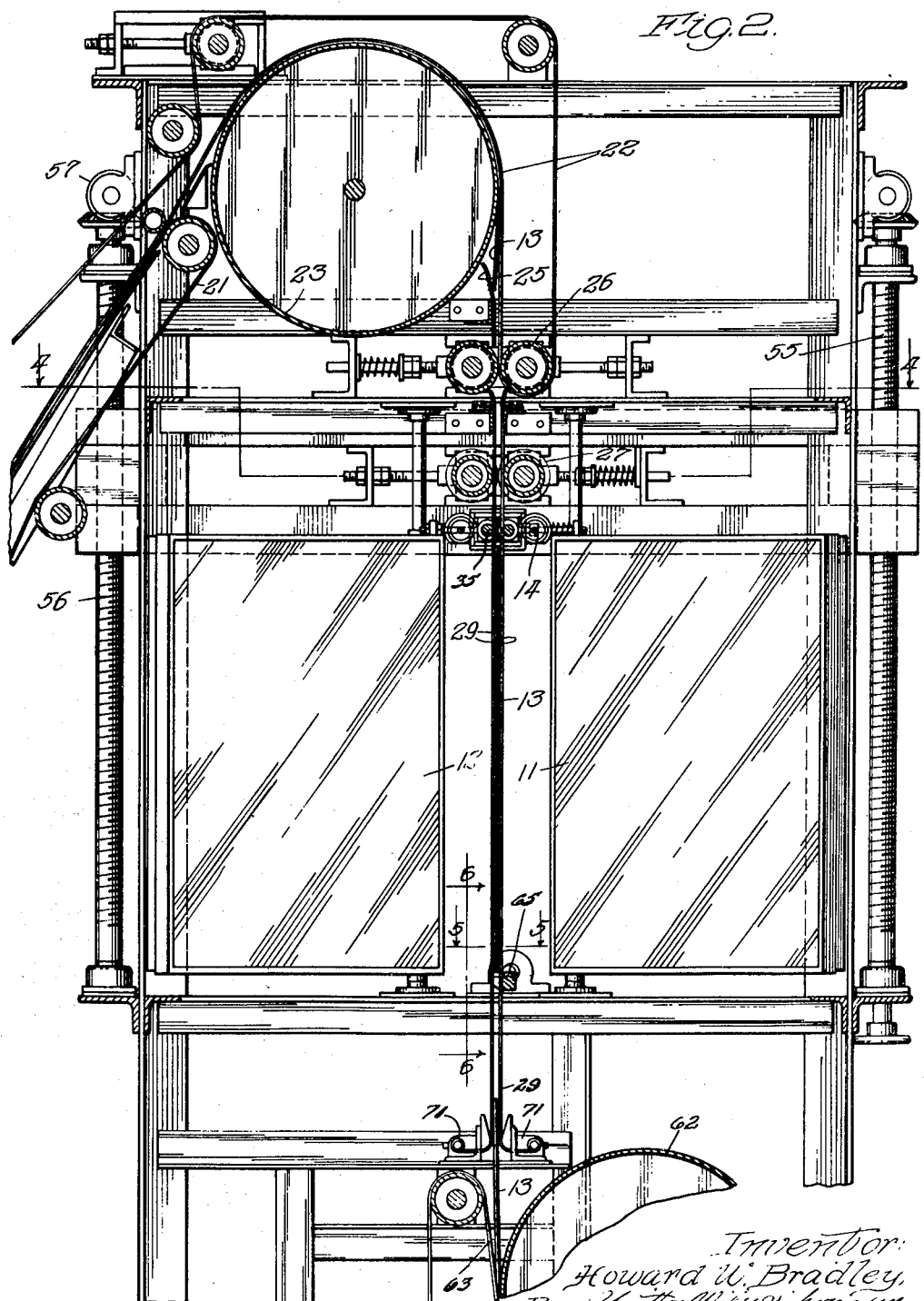

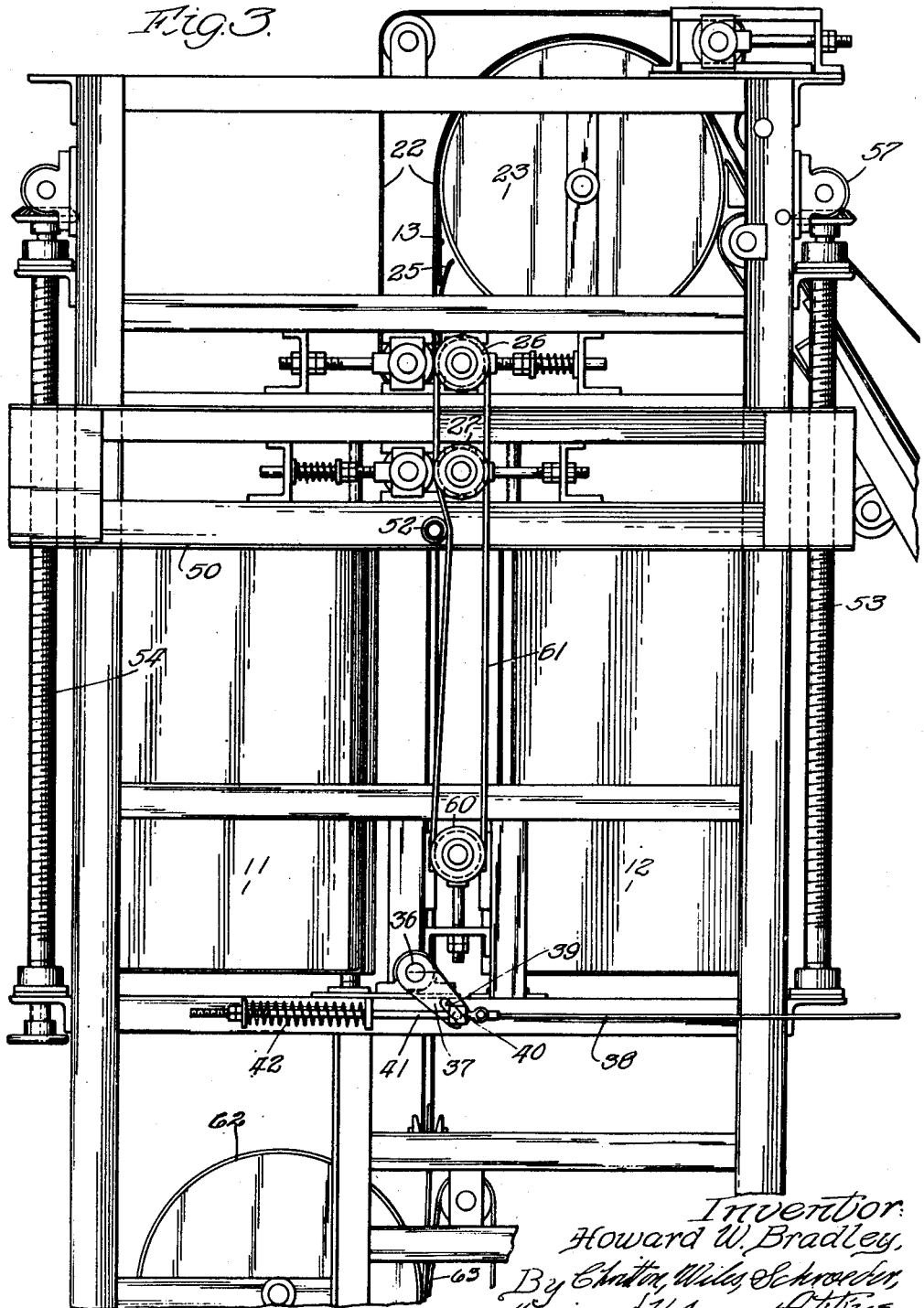

2,502,414

UNITED STATES PATENT OFFICE 2,502,414

APPARATUS FOR USE IN THE VISUAL INSPECTION OF TIN PLATES AND THE LIKE

Howard W. Bradley, Calumet City, Ill., assignor to Inland Steel Company, Chicago, Ill., a corporation of Delaware Application September 19, 1945, Serial No. 617,292

10 Claims. (Cl. 88—14)

This invention relates to a plate inspecting machine and more particularly to an apparatus for use in the inspection of tin sheet metal plates and the like. The invention is an improvement upon the device described in the application of Edwin D. Martin, Serial No. 617,293, filed September 19, 1945.

The invention is illustrated in the drawings in which,

Fig. 1 is a side elevation of the apparatus;
Fig. 2 is a section taken on the line 2—2 in Fig. 4;
Fig. 3 is a rear elevation of the apparatus;
Fig. 4 is a section taken on the line 4—4 in Fig. 2;
Fig. 5 is a section taken on the line 5—5 in Fig. 2;
Fig. 6 is a section taken on the line 6—6 in Fig. 2; and
Fig. 7 is a section taken on the line 7—7 in Fig. 4.

The apparatus comprises a frame 10, having a pair of mirrors 11 and 12 centrally located in a line with the eye of an operator seated in front and angularly adjusted so that the operator may simultaneously see both sides of a sheet 13 when it is in viewing position, as shown in Fig. 2. The sheets are suitably illuminated by lights 14.

The individual sheets are fed seriatim into viewing position by an elevating mechanism comprising a drum 20, a belt 21, a complementary belt 22, and a second drum 23. The individual sheets are picked up by any suitable and well known means, not shown, by which sheets may be picked up one at a time and are fed through the rolls 24 onto the belt 21 where they are contacted on the lower surface by the belt 21 and on the upper surface by the roller 20. The sheets are then passed upwardly until the upper surface is contacted by the belt 22 and are carried between belts 21 and 22 until the lower surface reaches the roller 23 where the sheets are then carried up and over the roller 23 and down the forward side thereof. The belts 21 and 22 may be driven synchronously, whereas the drums 20 and 23 may be simply idle. The roller or drum 23 is preferably a smooth surfaced steel drum.

As will be best seen in Fig. 2 the individual sheets 13 are passed downwardly from the drum 23. There is a tendency in the sheets to curl somewhat inwardly and they are directed into proper alignment by the guides 25 which direct them between the driven rolls 26, idler rolls 27, and brake rolls 35. From the time that the individual sheets leave the rollers 26 they are also guided by wires 29 which are spaced in pairs across the faces of the sheet.

The distribution of the wires is best shown in Fig. 6. The rollers 27 are, of course, suitably slotted to permit the wires to pass through them and this is also true of rollers 35.

All of the rollers are suitably tapered at the ends to accommodate the added thickness of the sheets which might occur at either edge portion. This thickening, of course, occurs only on hot dipped sheets due to the thickening at the drip or list edge.

The rollers 35 have spindles 28, are preferably of brass, and are provided with a brake 30, illustrated in Fig. 7. This brake comprises clamps 30a, a bolt 32 extending through the clamp, a spring 33 around the bolt held in position by a suitable nut 34, and friction members 31 pressed upon the rolls or their spindles by clamps 30a. Each friction member preferably comprises a pad of piano felt about one inch thick. The nut 34 is adjusted so that the speed of the sheets as they fall under gravity will not accelerate to a point where they will be injured at the conclusion of their fall.

The rollers 26 and 27 are connected with roller 60, as shown in Fig. 3, by means of a belt 61 which is pressed against the rollers 27 by the idler roller 52. Any one of the rollers 26, 27, 52 or 60 may be driven, preferably the roller 60, so that the sheets 13 are positively fed between rolls 26, 27 and 35 until the upper edge of the sheet has left roll 27. It then falls only under the influence of gravity and is retarded by the braking rolls 35.

Suitable means 65 are provided at the bottom of the mirrors for stopping the sheet and holding it momentarily. This means may be a sliding plate, but is preferably a tilting plate, best illustrated in Fig. 5. The plate is mounted upon a rod 36 extending from one side of the device to the other. One end of the rod 36 is secured to a crank arm 37, illustrated in Fig. 3, and in Fig. 4. This crank arm is secured by any suitable means to a reciprocating device 38. In the form here illustrated the arm contains a slot 39 within which is carried a pin 40 secured to a rod 41. This rod is automatically actuated in any suitable manner synchronously with the sheet feeding mechanism so that the plate 65 is tilted periodically immediately after a sheet has been supplied thereto. The compression spring 42, secured on the end of the rod 41, may be relied upon for returning the plate to its original position.

If desired, however, the rod may be positively fed in each direction.

The plate is, of course, provided with slots 45 through which the wires 29 pass.

The lower ends of the wires 29 are secured in brackets 71, best shown in Fig. 2. The wires guide the sheets 13, dropping from a plate 65 into engagement with the surface of the steel drum 62 and the driven belt 63. This belt, and the other belts, are preferably of a fabric material such as canvas. The sheets are carried on the belt 63, as illustrated in Fig. 1, to the separator 70. The separator is actuated by any suitable mechanical means, not here shown and not part of the present invention, through the medium of the button 46. This button operates an electrical system, including a time delay switch, such that the operator may push the button at any time between the time one sheet contacts the plate and the time the next sheet contacts the plate, with the result that the button, when pressed, will elevate the separator 45 at the proper time and thus bring the discarded sheet onto the belt 47. In normal operation the separator 70 is in the position shown in Fig. 1 and the sheets pass along the belts 48 and 49 to a pile where they are stacked and weighed. It will be observed that normally 2 or 3 sheets will be spaced along the belt 42, but that operation of the push button 46 affects the separator 45 only at the appropriate time and for the appropriate interval, discarding the sheet which has last been inspected by the operator before she pushes the button.

Inasmuch as the sheets employed may be of different sizes, it is preferred to provide means for adjusting the level of the feeding system. Such a means is best illustrated in Fig. 3 and includes bridge frames 50 and 51 located respectively at the rear and at the front of the device. These frames carry the rollers 27 and 35 and the idler roller 52, and are adjustable upwardly and downwardly by synchronous movement of the screw posts 53, 54, 55, and 56. The posts may be turned synchronously by any suitable mechanism as indicated at 57.

The operation of the device should be obvious from the foregoing explanation. The frames 50 and 51 are first adjusted to the proper height so that the braking rolls 35 will retain their effect upon the plate until it is substantially in viewing position. Individual plates are then fed at predetermined intervals seriatim through the elevating mechanism over the drum 23 and then dropped into viewing position before the mirrors 11 and 12. Ordinarily, sheets are fed at the rate of 54 to 90 per minute, depending upon the ability of the operator and the size of the sheet. The sheets impinge upon the plate 65, and usually bounce a very small fraction of an inch. They are held in position only long enough to produce a retained image on the retina of the eye of the observer. In actual practice, it has been found that the operator will view one side of the sheet in one mirror and then turn her eyes and view the other side of the sheet in the other mirror. The sheet should, therefore, be stopped long enough to permit retention of two images and the intervening movement of the eyes of the operator. The plate 65 is then automatically tipped to drop the sheet between the belt 63 and the drum 62. Any sheet which should be discarded is sent to the discard file by pushing the button 46 which operates the separator 70 by delayed action so that the appropriate sheet is discarded when it reaches the separator.

The drums 62 and 23 and 20 should all be of polished steel so as not to mar the surface of the sheets, and the radius of curvature of each of the drums is sufficiently great that no permanent curvature is imparted to the sheets.

The foregoing detailed description has been given for clearness of understanding only, and no unnecessary limitations should be understood therefrom.

What I claim as new, and desire to secure by Letters Patent, is:

1. Apparatus for use in the visual inspection of sheet metal, comprising: a viewing station; means for feeding sheets seriatim at predetermined intervals to said viewing station; means permitting both sides of a sheet at the viewing station to be simultaneously observed from a predetermined position; means for only momentarily stopping a sheet for observation at the viewing station including a movable plate in the path of the sheet upon which an edge of the sheet impinges; friction brake means acting on the sheet to limit its speed at the time of impingement; and means for moving the plate to permit the sheet to move from the viewing station, said means being coordinated with said sheet feeding means.

2. Apparatus for use in the visual inspection of sheet metal, comprising: a viewing station arranged to receive a metal sheet in upright position; feeding means terminating at a point above the viewing station, said feeding means being arranged to continuously feed a series of sheets positively to an upright position above the viewing station and then drop them by gravity into said station; means by which both sides of a sheet at the viewing station may be simultaneously observed from a predetermined position; means for only momentarily stopping a sheet for observation at the viewing station including a plate at the bottom of the viewing station upon which an edge of a sheet dropped by the feeding means impinges; friction brake means acting on the sheet to limit its speed at the time of impingement; and means for moving the plate to permit the sheet to drop therefrom by gravity, said means being coordinated with said sheet feeding means.

3. Apparatus as set forth in claim 2 in which the friction means acts on the sheet during the last portion of the positive feeding and during substantially the entire gravity drop.

4. Apparatus for use in the visual inspection of sheet metal, comprising: a viewing station; means for feeding sheets seriatim at predetermined intervals to said viewing station; means by which both sides of a sheet at the viewing station may be simultaneously observed from a predetermined position; means for only momentarily stopping a sheet for observation at the viewing station including a plate in the path of the sheet upon which an edge of the sheet impinges; a pair of idler rollers for engaging the sheet at the time of impingement; a friction brake acting on at least one of said rollers so as to limit the speed of the sheet at the time of impingement; and means for moving the plate to permit the sheet to move from the viewing station, said means being coordinated with said sheet feeding means.

5. Apparatus as set forth in claim 4 in which the friction brake is a felt pad.

6. Apparatus for use in the visual inspection of sheet metal, comprising: a viewing station;

means by which both sides of a sheet at the viewing station may be simultaneously observed from a predetermined position; means for feeding sheets seriatim to an upright position substantially vertically above the viewing station; a pair of positive feed rollers to engage a sheet in said position and feed it into the viewing station; idler rollers to engage a sheet between the feed rollers and the viewing station; and braking means for limiting the speed of the idler rollers.

7. Apparatus as set forth in claim 1 in which a moving belt and a drum grip a sheet leaving the plate to carry it away from the viewing station.

8. A device as set forth in claim 6 in which the idler rolls are adjustable vertically with respect to the viewing station.

9. A device as set forth in claim 6 in which the braking means for limiting the speed of the idler rolls includes a pad of piano felt in frictional engagement with the rollers.

10. In apparatus for use in the inspection of tin plate, means for feeding sheets seriatim at predetermined intervals into a vertical position in a viewing station, means for viewing both sides of the sheet from a predetermined position when the sheet is at the viewing station, a plate for momentarily stopping the sheet at the viewing station, said plate being movable between a supporting position beneath the sheet and a release position where the sheet is free to fall by gravity from the viewing station, and a large steel drum having an edge tangential to the path of fall of the sheets, and a conveyor belt contacting said drum and extending above the tangential portion thereof to serve as a guide in directing the sheets to the surface of the drum.

HOWARD W. BRADLEY.

REFERENCES CITED

The following references are of record in the file of this patent:

UNITED STATES PATENTS

| Number | Name | Date |
|---|---|---|
| 1,245,242 | Kohn | Nov. 6, 1917 |
| 1,482,198 | Lebeis | Jan. 29, 1924 |
| 1,608,837 | Bryce | Nov. 30, 1926 |
| 1,884,920 | Toleik | Oct. 25, 1932 |
| 1,965,819 | Allen | July 10, 1934 |
| 2,051,946 | Hewlett | Aug. 25, 1936 |
| 2,331,110 | Dillaman | Oct. 5, 1943 |

FOREIGN PATENTS

| Number | Country | Date |
|---|---|---|
| 477,356 | France | July 15, 1915 |